US012518588B2

(12) United States Patent
Perrow et al.

(10) Patent No.: US 12,518,588 B2
(45) Date of Patent: Jan. 6, 2026

(54) GAMING DEVICE INCLUDING A VARIABLE ADJUSTMENT DISPLAY

(71) Applicant: Aristocrat Technologies Australia Pty Limited, North Ryde (AU)

(72) Inventors: Shane Perrow, Kembla Heights (AU); Michael Baum, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 264 days.

(21) Appl. No.: 18/328,512

(22) Filed: Jun. 2, 2023

(65) Prior Publication Data

US 2024/0404346 A1 Dec. 5, 2024

(51) Int. Cl.
*G07F 17/32* (2006.01)
*G09G 5/10* (2006.01)

(52) U.S. Cl.
CPC ...... *G07F 17/3213* (2013.01); *G07F 17/3227* (2013.01); *G07F 17/3267* (2013.01); *G09G 5/10* (2013.01); *G09G 2320/0626* (2013.01); *G09G 2370/047* (2013.01)

(58) Field of Classification Search
CPC ............. G07F 17/3211; G07F 17/3213; G07F 17/3227; G07F 17/3267; G09G 2320/0626; G09G 2370/047; G09G 5/10
See application file for complete search history.

(56) References Cited

U.S. PATENT DOCUMENTS 10,339,751 B2 7/2019 Scott
2005/0239545 A1* 10/2005 Rowe ...................... G07F 17/32 463/29
2007/0021179 A1* 1/2007 Kobayashi .......... G07F 17/3211 463/16

(Continued)

FOREIGN PATENT DOCUMENTS

AU 2018358487 A1 * 5/2020 ............. A63F 13/26
WO 2019088432 5/2019

OTHER PUBLICATIONS

Wikipedia, Display Data Channel,Aug. 30, 2022/,<https://en.wikipedia.org/w/index.php?title=Display_Data_Channel&oldid=1107476260> (Year: 2022).*

(Continued)

*Primary Examiner* — Justin L Myhr
(74) *Attorney, Agent, or Firm* — Armstrong Teasdale LLP

(57) ABSTRACT

A gaming device includes a display assembly including a monitor controller board, a display panel, and a backlight for controlling a display brightness of the display panel and a display connector providing communication between a processor of the device and the monitor controller board. The processor is programmed to determine that a trigger condition has occurred, identify a brightness command based upon the trigger condition and a lookup in a memory, and transmit the brightness command to the monitor controller board. The brightness command causes the monitor controller board to control the backlight to increase the display (Continued)

brightness from a first brightness level to a second brightness level. The processor further causes display at the display panel of an animation associated with the trigger condition in synchronization with the increase in the display brightness.

20 Claims, 9 Drawing Sheets

(56) References Cited

U.S. PATENT DOCUMENTS

2007/0159491 A1* 7/2007 Panabaker ............ G06F 1/3218 345/553
2007/0174418 A1* 7/2007 Garcia ...................... G06F 8/65 709/217
2009/0023491 A1* 1/2009 Ikeya .................. G07F 17/3213 463/20
2009/0291757 A1* 11/2009 Hilbert ................ G07F 17/3202 463/31
2015/0367234 A1* 12/2015 Jones ...................... A63F 13/42 463/31
2018/0336758 A1* 11/2018 Scott .................. G07F 17/3211

OTHER PUBLICATIONS

Dell, Content Adaptive Brightness Control, https://www.t3.com/au/news/you-can-now-disable-the-dell-xps-13s-annoying-contrast-feature, 8 pages, published Dec. 21, 2015.

Dell, Dell XPS 13 9370: screen brightness changes based on window contents, https://superuser.com/questions/1354691/dell-xps-13-9370-screen-brightness-changes-based-on-window-contents, 3 pages, Sep. 3, 2018.

* cited by examiner

GAMING DEVICE INCLUDING A VARIABLE ADJUSTMENT DISPLAY

TECHNICAL FIELD

The field of disclosure relates generally to electronic gaming devices, and more particularly to displays for electronic gaming devices.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect an electronic gaming device is provided. The gaming device includes a display assembly including a monitor controller board, a display panel, and a backlight for controlling a display brightness of the display panel. The device further includes at least one memory device with instructions stored thereon, at least one processor in communication with the at least one memory device, and a display connector providing communication between the at least one processor and the monitor controller board. Execution of the instructions by the at least one processor causes the at least one processor to determine that a trigger condition of a plurality of trigger conditions stored in the at least one memory device has occurred and identify a brightness command based upon the trigger condition and a lookup in the at least one memory device. The instructions further cause the processor to transmit the brightness command to the monitor controller board, wherein the brightness command causes the monitor controller board to control the backlight to increase the display brightness from a first brightness level to a second brightness level. The instructions further cause the processor to cause display at the display panel of an animation associated with the trigger condition in synchronization with the increase in the display brightness.

In another aspect, a non-transitory, computer-readable storage medium with instructions stored thereon is provided. In response to execution by at least one processor, the instructions cause the at least one processor to determine that a trigger condition of a plurality of trigger conditions stored in the storage medium has occurred and identify a brightness command based upon the trigger condition and a lookup in the storage medium. The instructions further cause the at least one processor to transmit the brightness command to a monitor controller board of a display device, wherein the brightness command causes the monitor controller board to control a backlight of the display device to increase a brightness of the display device from a first brightness level to a second brightness level, and cause display at the display device of an animation associated with the trigger condition in synchronization with the increase in the brightness of the display device.

In yet another aspect, an electronic gaming device is provided. The device includes a game controller configured to generate a game outcome and a display device comprising a display panel, a backlight for controlling a brightness of the display panel, and a monitor controller board in communication with the backlight and the display panel. The device further includes a display connector providing communication between the game controller and the monitor controller board. The game controller is configured to determine that a trigger condition of a plurality of trigger conditions has occurred and identify a brightness command based upon the trigger condition and a lookup in at least one memory device of the game controller. The game controller is further configured to transmit the brightness command to the monitor controller board, wherein the brightness command causes the monitor controller board to control the backlight to increase the display brightness from a first brightness level to a second brightness level, and cause display at the display panel of an animation associated with the trigger condition in synchronization with the increase in display brightness.

DETAILED DESCRIPTION

Conventionally gaming machines are engineered with fixed brightness settings and tight tolerance to ensure consistency of look and feel across the gaming products (i.e., across different games, different machines and even venues). The tight tolerances applied to brightness during manufacturing can also ensure consistency between different machines. Once the backlight is engineered and refined, the brightness for all production units is generally fixed for life. This fixing of the display brightness is based on a combination of inherent display hardware capability (i.e., a minimum and maximum brightness the device hardware can achieve consistently over the whole display) and parameter values pre-set in display driver firmware and/or software during manufacture. Such known gaming devices include certain technical problems associated with fixed display brightness, including: i) inability to provide additional visual features without otherwise altering the game content display or animations; ii) inability to provide flexibility in game display lighting options and tailoring of brightness for different games, iii) and inability to enable different brightness when the machine is operating in an attract mode to when being used for game play.

An electronic gaming device of the present disclosure includes a display assembly including a monitor controller board, a display panel, and a backlight for controlling a display brightness of the display panel, and a game controller that is connected to the monitor controller board by a display connector. The game controller is configured to transmit brightness commands to the monitor controller board, which cause the monitor controller board to control the backlight to change the display brightness based on certain events occurring during play of the game. Gaming machine displays for all of the various gaming machine embodiments described above can use conventional high resolution and high-performance display technologies such as LCD, plasma, LED, etc. As the display backlighting is based on parameter settings, and therefore independent of content rendering for the display, dynamic backlighting commands can be independent of content, such as animations. This has technical improvements of at least: i) providing additional visual features (a "pop" of brightness) without otherwise altering the game content display or animations; ii) providing flexibility in game display lighting options and tailoring of brightness for different games; and iii) enabling different brightness when the machine is operating in an attract mode to when being used for game play.

Figure 1:
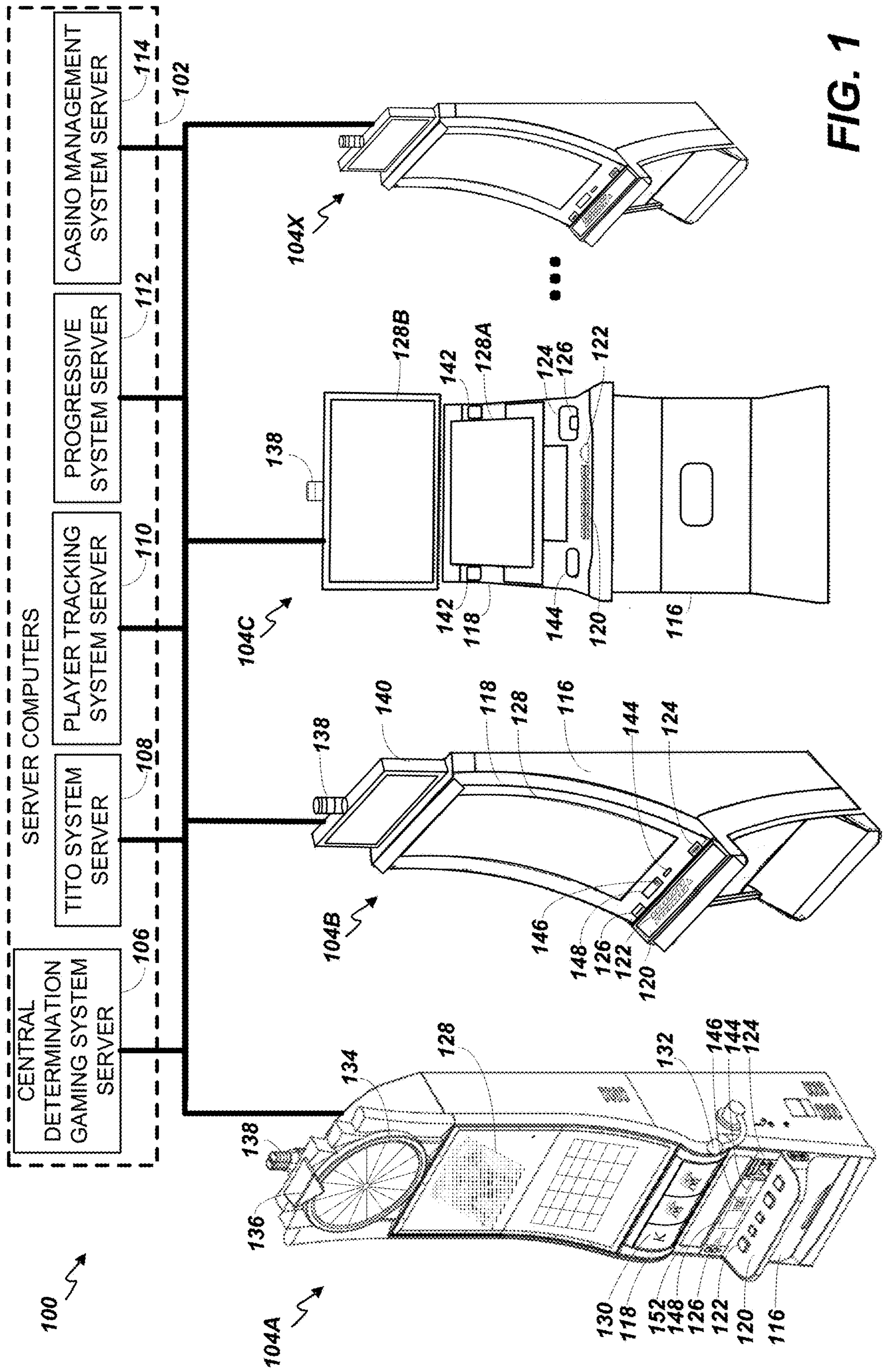
FIG. 1 is an exemplary diagram showing several gaming machines networked with various gaming related servers.

As animations are often triggered by events or trigger conditions occurring during game play (and monitored for by the game controller) a game controller may be enabled to exhibit dynamic brightness variations by storing a set of brightness control commands and associated trigger conditions in memory. By utilizing trigger conditions to activate brightness control commands, the brightness adaptation may be triggered similarly to animations or other visual effects during game play. Thus, requiring no or little additional game programming, as the same triggers for display or sound effects may also be utilized for dynamic backlight affects FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
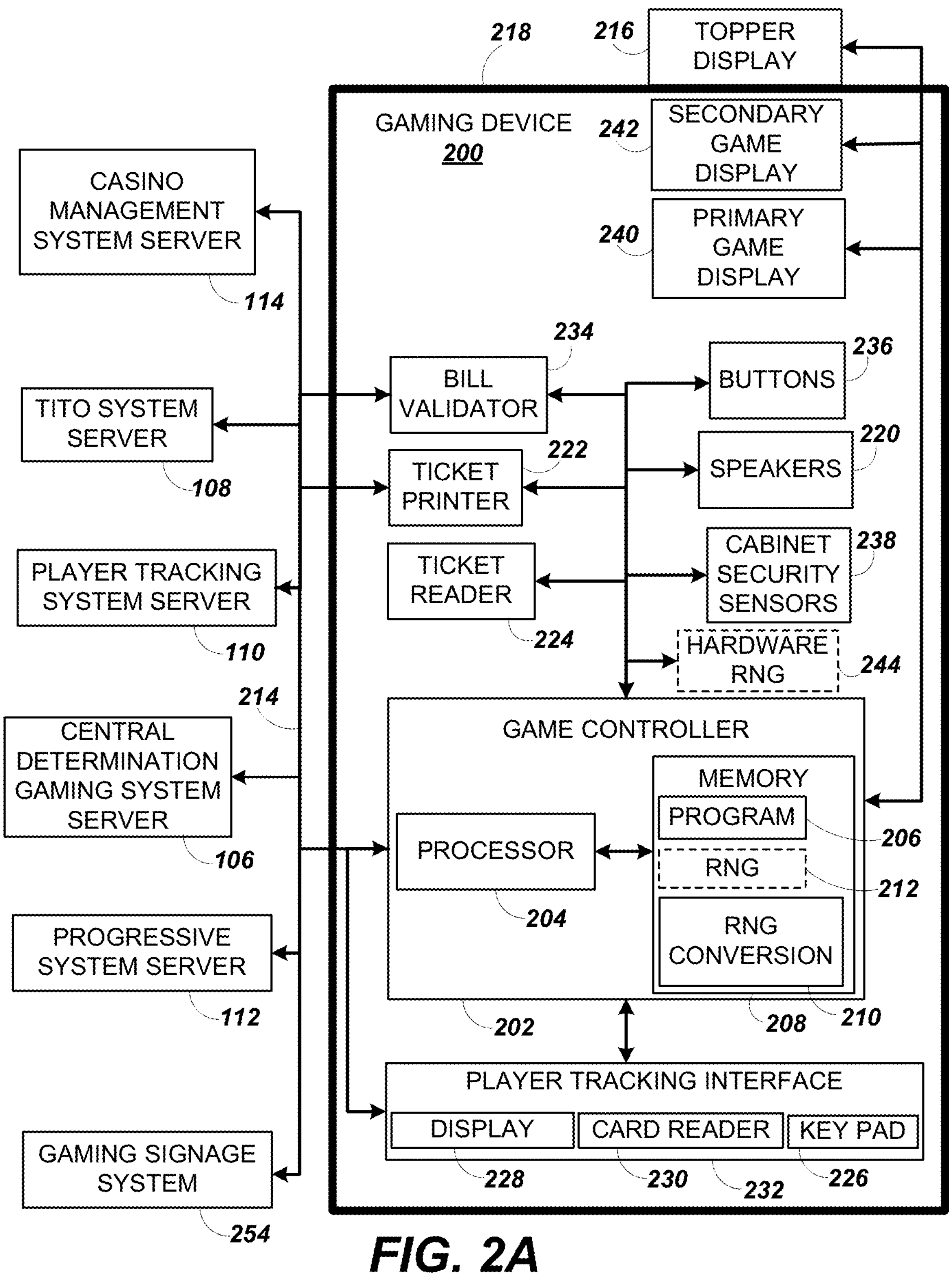
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
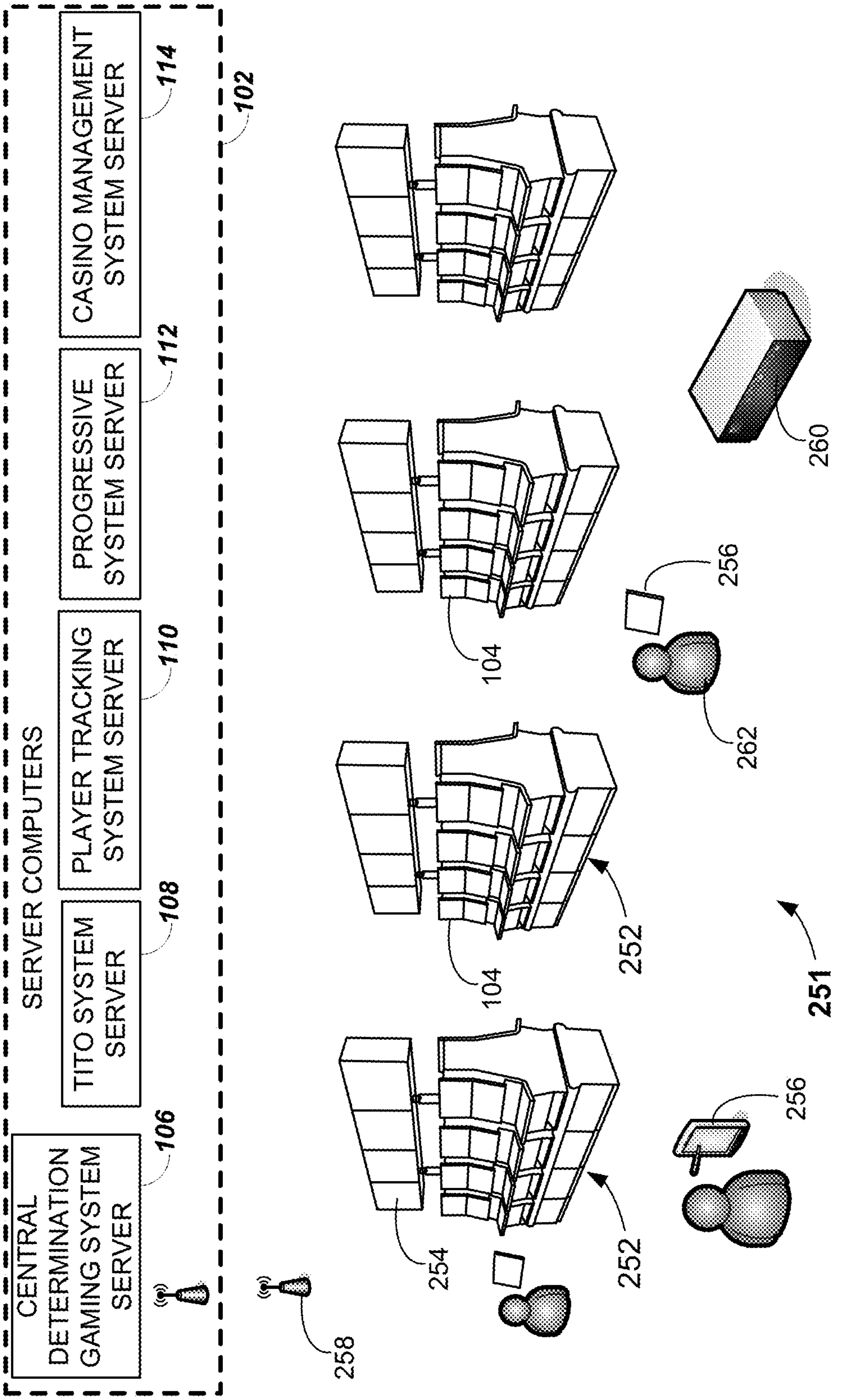
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
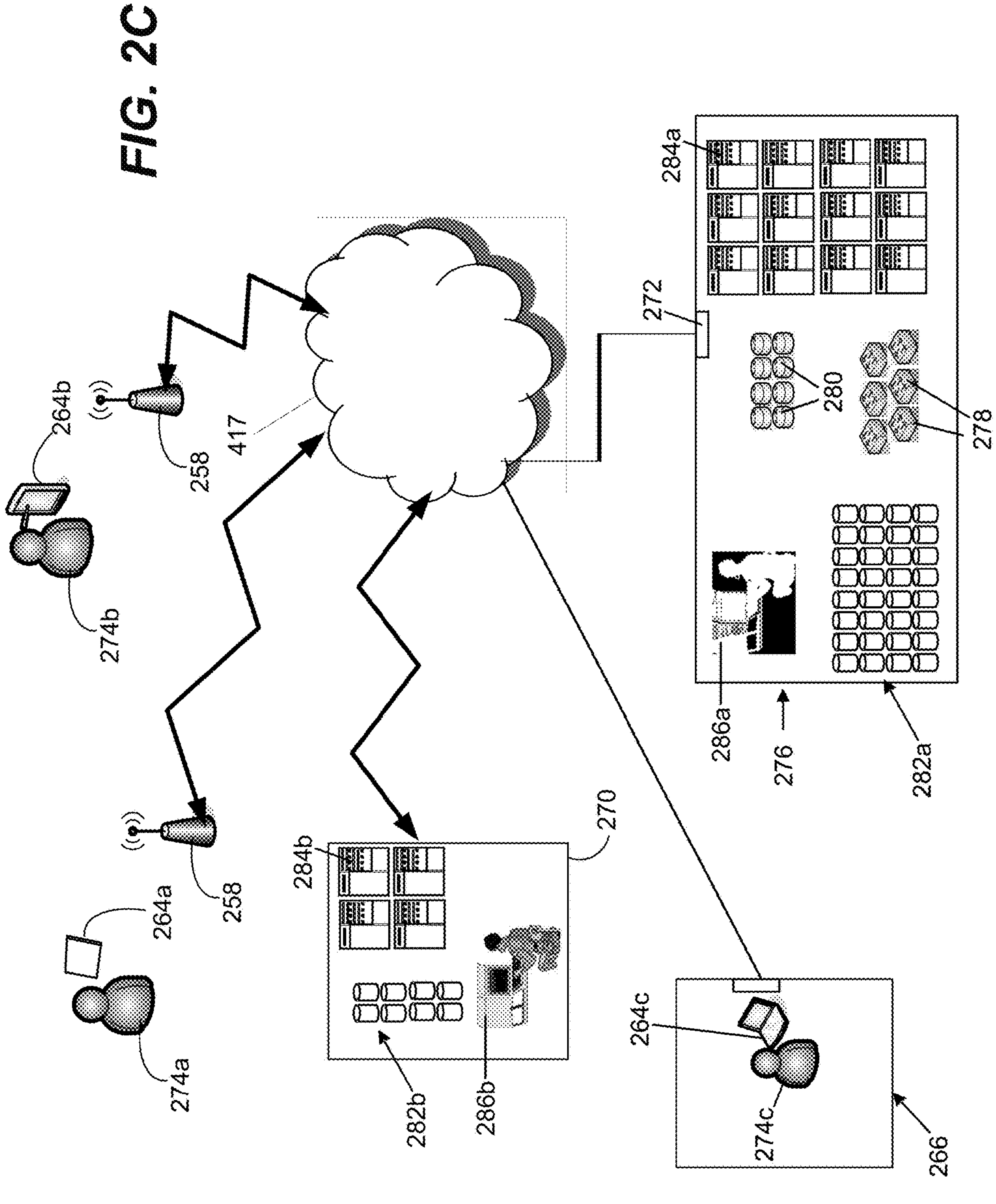
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
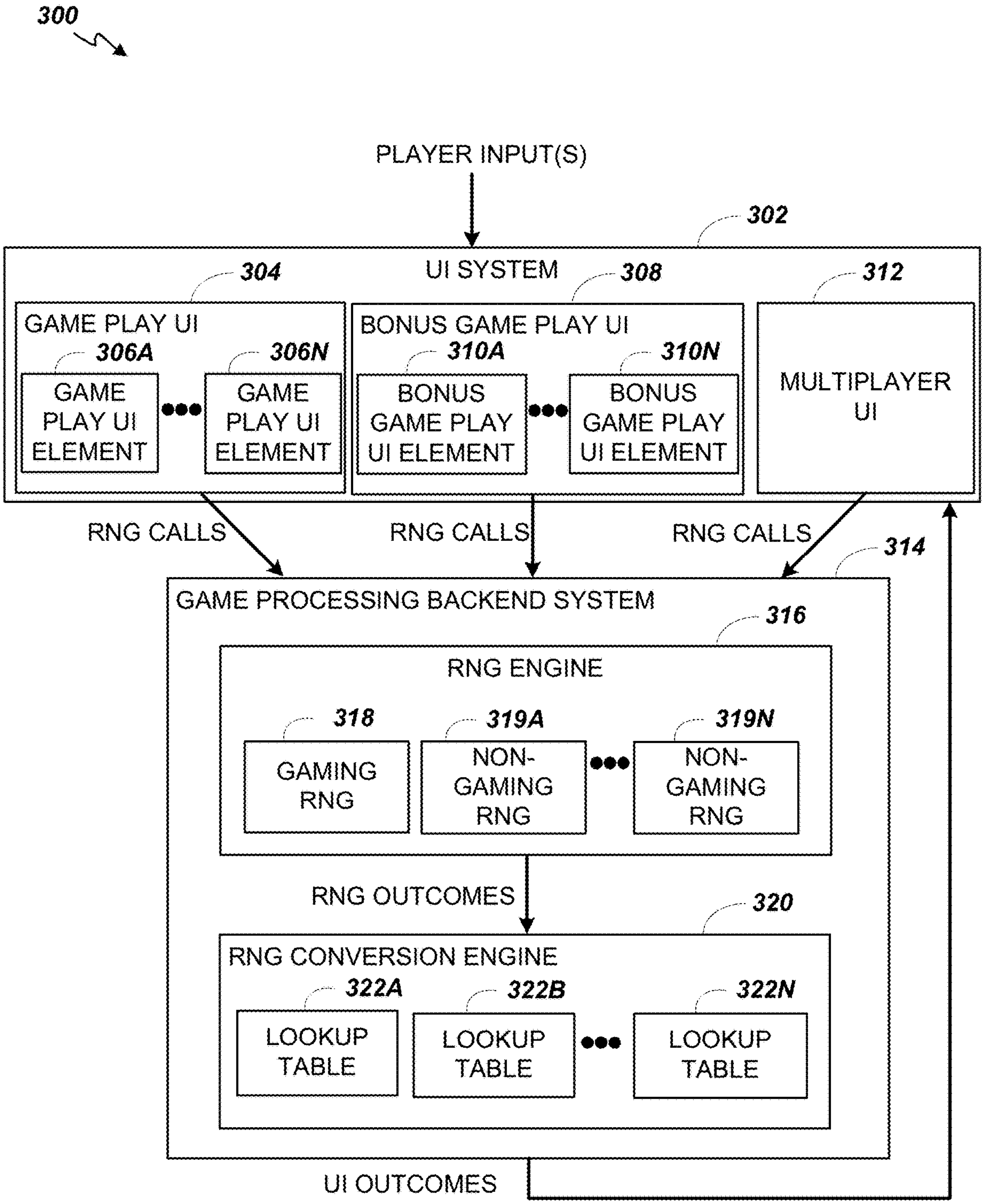
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
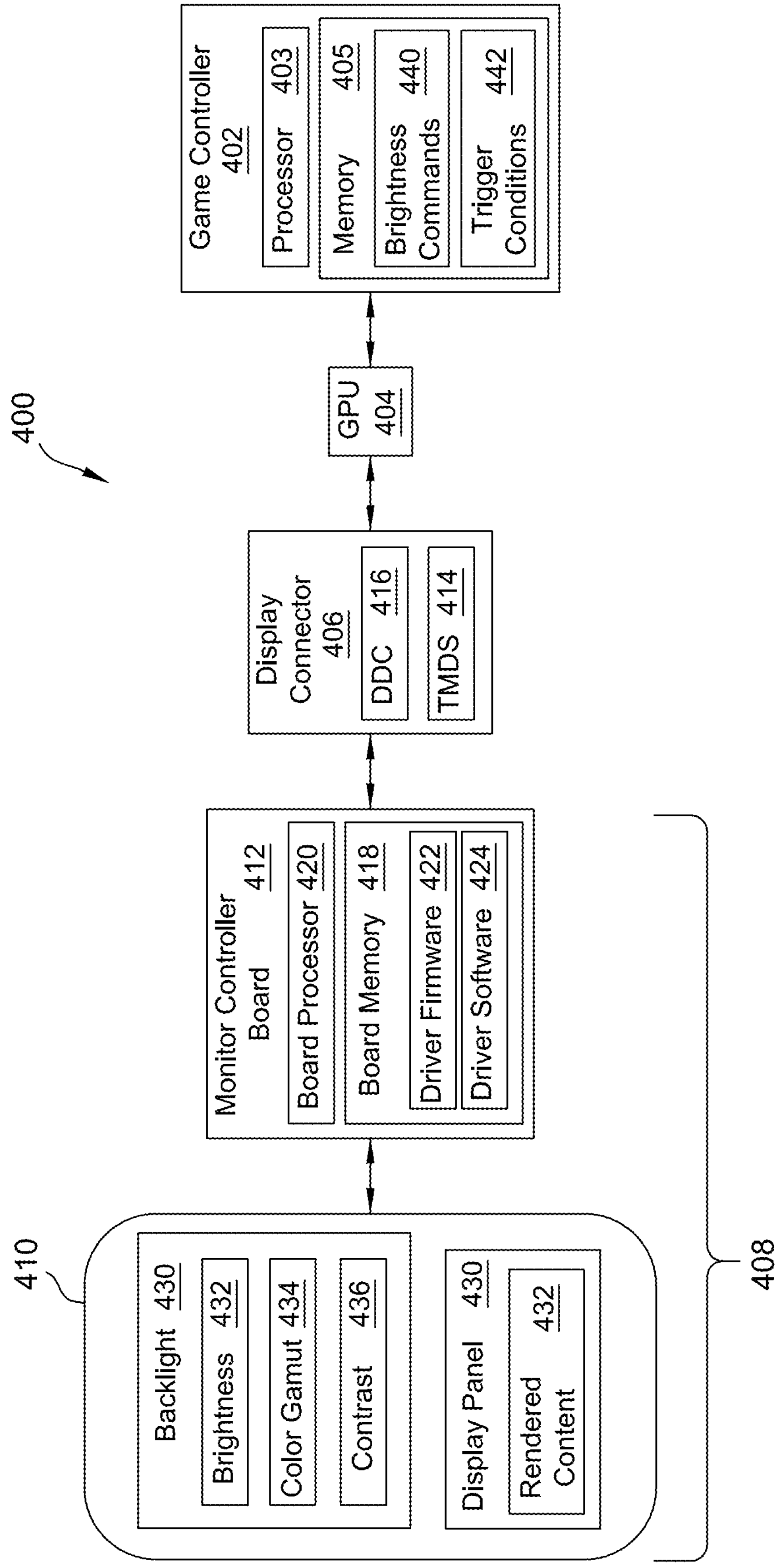
FIG. 4 is a schematic view of a gaming device according to an embodiment of the present disclosure.

FIG. 4 is a schematic depiction of a gaming device 400, which in some embodiments, may be an implementation of gaming devices 104A-104X described with respect to FIG. 1.

As shown in FIG. 4, the electronic gaming device or "gaming device" 400 includes a game controller 402, a graphics processing unit ("GPU") 404, a display connector 406, and a display assembly 408 (also referred to herein as a "display device"). The display assembly 408 includes a display module 410 and a monitor controller board 412, also referred to herein as a "monitor controller" or an "analog/digital board" ("A/D board").

The game controller 402 includes a processor 403 and a memory 405 storing instructions thereon. The game controller 402 determines game outcomes and generates display commands, in combination with the GPU 404, for display at the display module 410. In some embodiments, the GPU 404 and the game controller 402 are integrated as a single control unit (not shown). Moreover, in some embodiments the game controller 402 is substantially the same as the game controller 202 (shown in FIG. 2).

The game controller 402 and the GPU 404 are connected to the monitor controller board 412 by a display connector 406. In the example embodiment the display connector is a wired connector. In some embodiments, the display connector 406 includes at least one of a Digital Visual Interface ("DVI") connector, a High-Definition Multimedia Interface ("HDMI") connector, and a Video Graphics Array ("VGA") connector. In other embodiments the display connector 406 includes any suitable connector.

The display connector 406 includes a plurality of data pins 414, 416 through which data communications between the game controller 402 and the monitor controller board 412 are facilitated. Each of the data pins 414, 416, illustrated schematically in FIG. 4, may include one or a plurality of data pins (not shown). In the example embodiment the plurality of data pins 414, 416 include a Transition-Minimized Differential Signaling ("TMDS") pin 414 and a Display Data Channel ("DDC") pin 416. The DDC data pin 416 enables the monitor controller board 412 to communicate its supported display modes to the GPU 404 and enables the GPU 404 and game controller 402 to adjust monitor parameters. The game controller 402 and GPU 404 use a Monitor Control Command Set ("MCCS") messaging protocol for communications over the DDC data pin 416 to facilitate adjustment and control of the monitor parameters by the game controller 402.

The monitor controller board 412 allows for various video source inputs to be connected (e.g., by the display connector 406), selected, and displayed on a display module 410. In the example embodiment the display module 410 is a liquid crystal display ("LCD") screen, though in other embodiments, the display module 410 may include any suitable display. The monitor controller board 412 includes a board memory 418 and a board processor 420. The board memory 418 stores a display driver firmware 422 and driver software 424 thereon. The driver firmware 422 is used to decode data transmitted from GPU 404 and/or the game controller 402 over the DDC 416 into a format readable by the software 424 for use in controlling parameters of the display assembly 408.

The monitor controller board 412 adjusts the input signal, scaling resolution, and then outputs a signal to the display module 410, controlling the display module 410. Example output signals include low-voltage differential signaling ("LVDS"), Serial Peripheral Interface ("SPI"), Inter-Integrated Circuit ("I2C"). The monitor controller board 412 output causes the illumination of pixels (not shown) on a display panel 426 of the display module 410, thereby causing display of a given image or animation associated with operation of the game as rendered content 428. Additionally, the monitor controller board 412 may control a backlight 430 to adjust monitor display parameters of the display module 410, such as the brightness 432, contrast 436, color gamut 438. In some embodiments, the monitor controller board 412 may additionally or alternatively be further configured to adjust additional display parameters, such as aspect ratio and display resolution.

In the example embodiment, the gaming device 400 is configured to vary the monitor display parameters 432, 434, 436 based on commands from the game controller 402. As an example, the monitor controller board 412 is configured to receive commands from the game controller 402 to adjust brightness parameter values in the driver firmware 422. The driver firmware 422 converts the instructions to a format executable according to the software 424 for dynamically adjusting the display brightness. Based on the commands, the monitor controller board 412 may adjust the brightness 432 of the display by controlling a level of current provided to the backlight 430. As a result, instead of the display backlight brightness 432 being fixed, the brightness 432 may be varied during and/or in between game play, in response to commands issued by the game controller 402. For example, game controller 402 commands can be used to dynamically adjust monitor parameter values, that are otherwise typically fixed in the driver firmware 422 and/or software 424.

Additionally or alternative, the monitor controller board 412 is further configured to adjust the display contrast 436 and/or the color gamut 438 based on commands received from the game controller 402. As an example, during normal operations the display module 410 may have a color gamut setting of standard red, green, blue ("sRGB"). During a burst display feature, the game controller 402 may cause the display module 410 to transition the color gamut setting to a second different setting, such as a wide color gamut setting (e.g., P3D65).

Enabling the game controller 402 to dynamically adjust the display brightness 432 provides an option to trigger temporary changes in display brightness 432, for example to add a "pop" of brightness to emphasize a winning outcome, aspect of an animation or display of a special symbol in a game outcome. The display brightness 432 may also be dynamically adjusted based on the game being played, gaming device 400 state (i.e., attract mode, tilt mode or game play), or casino operator preferences.

In the example embodiment, the game controller memory 405 stores a plurality of display brightness commands 440 and a plurality of trigger conditions 442. Some of the display brightness commands 440 may be associated with one of the trigger conditions 442 which can occur during game play. For example, a library or look up table of trigger conditions 442 and associated display brightness commands may be stored in memory. In other embodiments the memory 405 may further store commands for controlling other monitor parameter values such as contrast 436, color gamut 438, aspect ratio, and/or display resolution.

The control of the backlight 430 of the display module 410 is based on the parameter settings (e.g., brightness 432, color gamut 434, contrast 436), and is independent of content rendering for the display module 410. Dynamic commands of the monitor parameters 432, 434, 436 may be independent of content, such as animations. During use, the game controller 402 may generate commands to control the display module 410 to providing additional visual features (e.g., "pop" of brightness) without otherwise altering the game content display or animations, providing flexibility in game display lighting options and tailoring of brightness for different games, and enabling different brightness 432 when the gaming device 400 is operating in an attract mode as compared to when being used for game play.

As animations are often triggered by events or trigger conditions 442 occurring during game play (and monitored for by the game controller 402) the game controller 402 may be enabled to exhibit dynamic brightness variations by storing the set of brightness control commands 440 and associated trigger conditions 442 in memory. By utilizing trigger conditions 442 to activate brightness control commands 440, the brightness adaptation may be triggered similarly to animations or other visual effects during game play. Thus, requiring no or little additional game programming, as the same triggers for display or sound effects may also be utilized for dynamic backlight affects.

In an alternative embodiment brightness commands 440 may also be added to libraries of animations, the brightness commands 440 being associated with animations or display of the game. For example, brightening the backlight 430 timed with fireworks, or darkening the backlighting with a candle snuffing or spooky animation. This may simplify coding, for example by coding for game animations from the library being automatically compiled with appropriate brightness control commands, rather than these being separately defined. In another example, a library of associated animations and brightness control commands 440 may enable game program code to be recompiled to include brightness commands associated with animations from the library, thereby enhancing how the game is displayed with minimal recoding or redevelopment. Optionally, game code for controlling visual presentation of the game and animations may include brightness commands to execute if loaded into a compatible gaming device 400, or not execute if the gaming device 400 is not enabled for dynamic brightness control.

The hardware of the display assembly 408, the firmware 422, and the software 424 of the display assembly 408 is configured to allow (or "reengineered to allow") the backlight 430 to be dynamically controlled by the software of the game controller 402. For example, allowing monitor parameter values 432, 434, 436 associated with controlling the display backlighting, that are conventionally constant, to be variables which are adjustable during operation, including during game play, by command. The modification allows the game controller 402 to directly control backlight parameter values 432, 434, 436, set in either software 424 or firmware 422 of the monitor controller board 412. With this modification, the game controller 402 can trigger near instantaneous ramping up and/or ramping down of the backlight brightness 432, contrast 436, and/or color gamut 438. This enables temporary or pulsatory backlight changes.

Embodiments enhance the user experience by enabling additional visual effects displayed at the display module 410. This can be particularly advantageous during play of feature games. Brightness commands 440 can be configured to alter backlight brightness 432 for short periods of time or to pulse the backlight brightness 432. With short pulses of backlight brightness 432, game designers can add to the "pop" of feature events. This may be similar to how some designers use additional cabinet LED lights to emphasize features, for example using quick blasts of bright lighting, timed with sounds and animation. However, by utilizing backlight adjustment, an extra "pop" of brightness can be achieved without needing the additional hardware (such as LED light arrays) to be included in the gaming machine hardware.

Brightness adjustment commands are associated with trigger conditions 442 which occur during gameplay. For example, "pops" of high brightness when a special symbol is displayed in a game outcome (for example, a special symbol on a spinning reel), the "pop" of brightness may occur for a few milliseconds as the special symbol appears to pass the screen in an animation of spinning reels. Where the special symbol occurs in a game outcome, the backlighting of the display module 410 may pop as an animation (for example showing the special symbols appear to sparkle) is displayed in conjunction with the game outcome displayed in the rendered content 428 of the display panel 426. The brightness adjustment command 440 may be triggered to display on the stopping of the spinning reels, such that the brightness change is choreographed with a displayed game outcome animation. The adjustment command may be configured to also have a duration of enhanced brightness which matches the duration of the relevant animation (for example while a symbol sparkles, or for a lightning flash). More than one brightness adjustment may also be triggered for a game outcome. For example, when a game outcome with the special symbols is displayed, a temporary "pop" of high brightness occurs when a special symbol first appears in a game outcome. Then in conjunction with display of a pay-line through a combination of winning symbols the display brightness may pulse (brighter and back to normal) to highlight the win. In another example, the win line may show an animation of fireworks, and the brightness be adjusted to "flash" with the fireworks explosions. The backlight adjustment may actually look and feel quite subtle when added, but it will give extra 'pop' that the game designers are looking for in that blast of animation and sound.

For gaming devices comprising multiple displays, brightness adjustment commands may be display specific. For example, in embodiments in which a gaming machine includes 3 screens (a main game display screen, a player interface touch screen, and a player tracking module ('PTM') display) where an animation to be enhanced by increased brightness occurs on only the main game display screen, the brightness adjustment command may be directed only to the main screen. Thus, the display brightness adjustment may also be utilized to direct player attention to different screens.

Embodiments may also include a function to enable an operator to adjust the backlight brightness 432 to suit the needs of the operator/player. In this embodiment a control, such as a slider, will be displayed to enable the player to adjust the machine setting for their gaming session. For example, the control to adjust the machine setting may be presented, in response to an initial wager being input, on a welcome or game selection screen. Player manipulation of the control causes the game controller 402 to send a backlight adjustment command to the monitor controller board 412. Once a player ceases to play, or the gaming device 400 returns to idle, a further command can be sent by the game controller 402 to reset the display brightness 432 to a default or casino operator set value.

In some embodiments a player's backlight adjustment may be captured and stored as a preference associated with the player by the player tracking system server 110 (shown in FIG. 2A). Where such data is associated with a player and the player presents their player tracking ID (i.e., token, card or login details) at a gaming device 400 enabled with the backlight adjustment, the game controller 402 may automatically send a command to the monitor controller board 412 to adjust the backlighting to the player preference. Once the player logs out from the machine the backlight preference can be adjusted back to the default or casino operator settings by the game controller 402.

The ability to store a player brightness preference may also be advantageous for individuals with visual sensitivity or impairment. For example, a visually impaired individual may be able to utilize an "accessibility" preference to enable the machine to automatically adjust brightness to a preferred range. Brightness effects controlled by the game controller may then operate within this player specific preferred range. A person with sensory sensitivity may be able to store preferences for a lower backlight brightness and reduced brightness variation. An accessibility option may be provided to allow a player to opt-out of brightness variation. As these settings are linked to player tracking, once a player tracking card is removed from the gaming machine the game controller 402 commands the display to revert to default brightness.

In such embodiments a minimum and maximum brightness may be preset and operator adjustments only enabled within this range. For example, the minimum and maximum may be based on backlight levels for the game and any animations to display correctly. The minimum may be set to avoid a circumstance where some games may be set by agents of game competitors to lower, less appealing, levels within a gaming environment.

In an embodiment, display backlight brightness settings may be adjusted by the casino operator. It should be appreciated that as the game controller 402 can command backlight adjustments, where gaming devices are connected into a gaming network, common adjustment commands may be triggered for all of the gaming devices, from a central gaming server. Thus, it is not necessary for a staff member to manually adjust all gaming devices on a gaming floor if there is a desire to change brightness settings. For example, there may be a desire to change brightness settings based on regional preferences or to suit the environment the games are in.

Embodiments can enable game-based adjustment of backlight brightness. For example, new displays and content crafted for new displays is typically designed to take advantage of the color vibrancy, speed, and subtlety of shading available using modern display technology. However, legacy games, originally designed to operate with older display technologies, were typically not designed for high backlight brightness and may sometimes look unappealing until the backlight is dimmed. This presents a technical problem for fixed backlight gaming machines offering both new and legacy games, and the backlight level must be chosen as a compromise, with cabinets shipped with a lower brightness to display the legacy games losing the opportunity to show the new games at a higher brightness. Embodiments of the present gaming device can include game-based backlight adjustment commands to, upon initiation of the game, set the display backlight to a brightness suitable for the game content. This may include also setting a range for minimum and maximum player-based adjustment for the particular game.

In an embodiment, display brightness settings may be automatically adjusted based on whether the gaming device is in an active state to control overall power consumption of the display. For example, in some embodiments, the display brightness may be automatically lowered to an inactive state setting after a predetermined time period expires in which there is not player engagement (i.e., pushing of at least one button or initiation of a wager) of the gaming device. The display brightness may then be raised to an active state setting in response to player engagement with the gaming device. In some embodiments, the gaming device may include one or more sensors that are configured to detect the presence of the player at the gaming device. In such embodiments the display brightness may be raised (i.e., brought to an active state setting) in response to detection of a player by the one or more sensors and may be lowered to an inactive setting in response to a predetermined time period elapsing in which a player is not detected at the gaming device.

In an embodiment, regional or market specific brightness settings may also be stored in memory of the gaming machine and configured to appropriately adjust the display brightness on initial installation, for example in conjunction with other regional setting such as language and time zone, which may be configured by the casino operator. For example, North America has traditionally called for higher brightness products, whereas other regions such as Australia, New Zealand, and Asia-Pacific often prefer lower brightness products. Having the game controller 402 in control of the brightness dynamically, means that the game can run the display brightness based on the market configuration setting that it is running.

In some embodiments, for example where gaming machines are communicatively connected via a gaming network, enabling the game controller 402 of individual gaming machines to control the display brightness, enables networked gaming machines to display group changes or effects, which may be affected by a signal from a networked casino controller. For example, the casino controller via the casino network may signal to one or more gaming machines to adjust the display brightness of these selected one or more gaming machines. In one example, this group change may be to adjust operating brightness in accordance with market preferences. In an alternative example, this may be to achieve group effects. For example, a bank of gaming machines may be signaled to increase brightness to attract attention if none are in play. In an alternative example, a group of gaming machines all involved in a jackpot game may be triggered to increase brightness in response to one gaming machine being awarded a jackpot.

Figure 5:
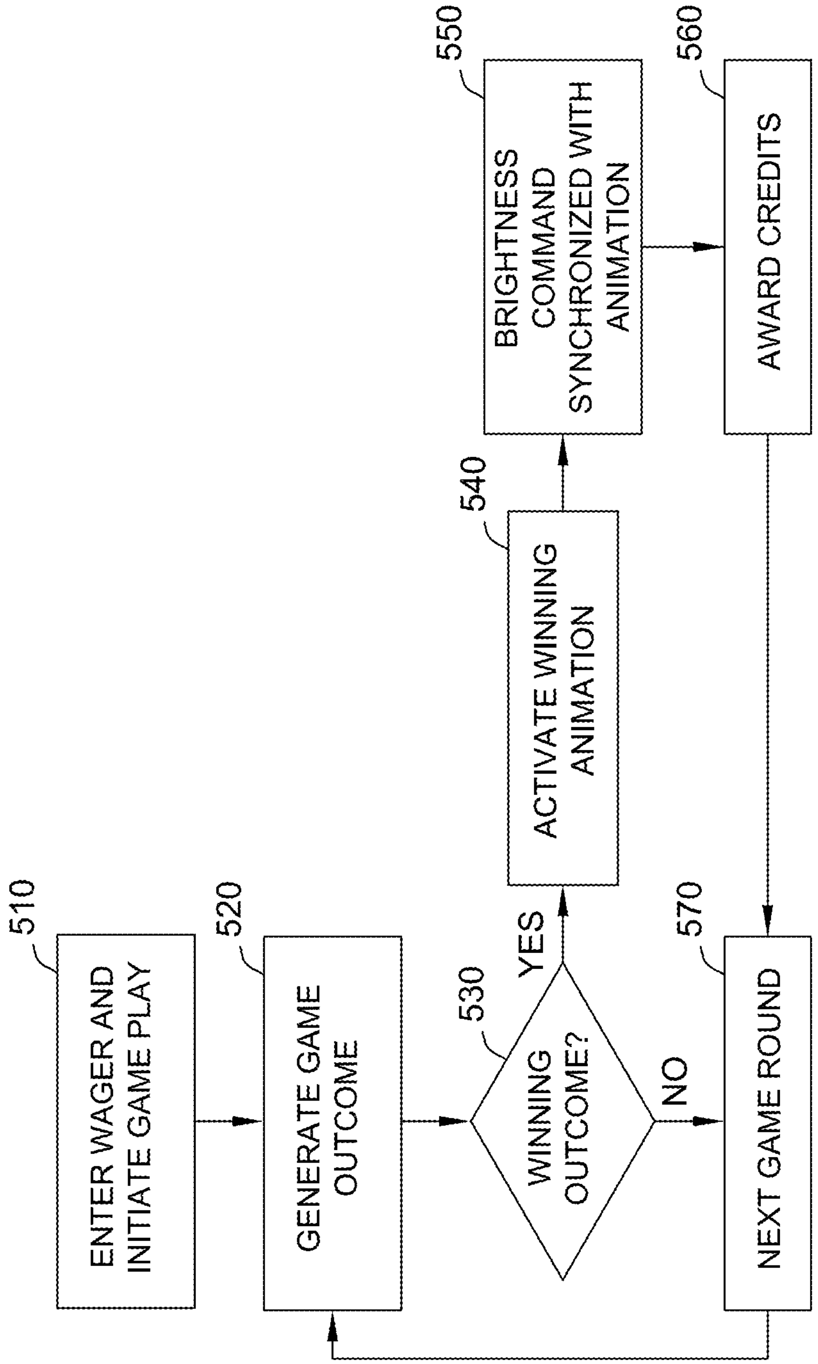
FIG. 5 is a flow diagram of an example game execution for use with the gaming device shown in FIG. 4.

FIG. 5 illustrates a flow diagram of an example game execution with dynamic temporary brightness adjustment. At step 510, a player enters a wager to initiate game play. In some embodiments, the entering of the wager may trigger an initial brightness adjustment from an "attract" mode to a "game play" mode brightness. At step 520, the game controller 402 (shown in FIG. 4) generates a game outcome using the random number generator 212 (shown in FIG. 2). The game outcome is displayed as rendered content on the display panel 426.

At step 530, the game controller determines whether the game outcome is a winning outcome. Where a losing outcome occurs, the process may proceed to step 570 in which a next game round is initiated. Where a wining outcome occurs, the process proceeds to step 540, where a winning animation is initiated as rendered content on the display panel 426 (for example, fireworks along a win line). At step 550, a backlight brightness adjustment command is sent to the monitor controller board 412 using the DDC data pin 416 of the display connector 406 to adjust the display brightness by controlling a voltage of the backlight 430. The brightness adjustment command is timed to coincide with the animation (for example, the fireworks explosion and flash) and may pulse in time with the animation. At step 560 the credits are awarded and at step 570 the next game round is initiated.

In some embodiments, the brightness 432 may additionally or alternatively be adjusted based on a gaming device operating mode. For example, while a game is idle, waiting for a player, the gaming device 400 may enter an "attract" mode, where examples of games or other animations and sounds are played automatically, based on signals from the game controller 402, aiming to attract the attention of potential players. When the machine is in "idle" or "attract mode" the display module 410 may be lit at full brightness to attract the attention of potential players from a distance on a game floor. The brightness level during the attract mode may be uncomfortably bright if one were sitting at the gaming device 400 to play. When credit is entered by a player to initiate game play (e.g., at step 510), the gaming device transitions from the "idle" or "attract" state and transitions to a gameplay state. This transition can trigger a brightness adjustment to lower the brightness to a level more comfortable for play by a player sitting or standing at the gaming device 400.

The player selecting to "cash out" or spending a set period of time idle, can trigger the game controller 402 to adjust the brightness to increase again. Transition of the gaming device 400 back to an "attract mode" may also trigger the brightness increase.

It should be appreciated that embodiments of the disclosure enable game designers to define numerous trigger conditions and associated brightness adjustments. Thus, game designer can utilize adjustment of display brightness to enhance visual effects. Casino operators are also provided with greater flexibility to adapt the look and feel of their venues. The game controller can monitor for the various trigger conditions both during game play and while idle, and effect brightness adjustment on occurrence of a trigger condition.

Figure 6:
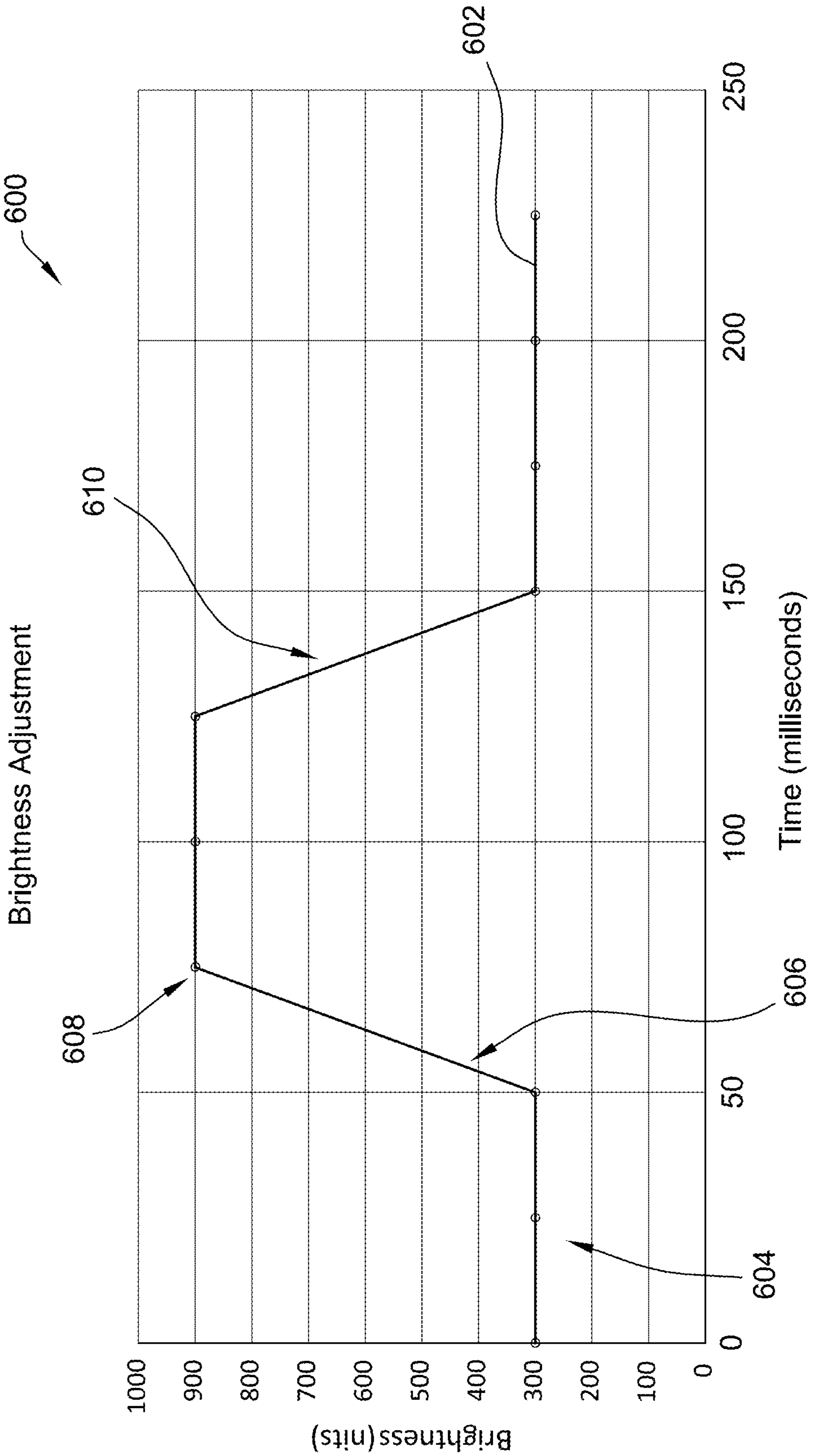
FIG. 6 is a chart showing display brightness of a display of the gaming device shown in FIG. 4, according to a first brightness command.

FIG. 6 is a chart 600 showing display brightness in nits varied over a given time period for a first brightness command. The vertical axis indicates brightness 432 of the display panel 426 (shown in FIG. 4) in nits and the X-axis indicates time in milliseconds ("ms").

In the example embodiment, at time period 0 ms, the display panel 426 is in a baseline or "normal" brightness of state of 300 nits, indicated at 604. At time period 50 ms, the display pop sequence is initiated, causing the display brightness to increase from 300 nits to 900 nits over the time period between 50 ms and 75 ms (also referred to herein as a "ramp-up period"), indicated at 606. In other embodiments, the display panel may have any suitable increased brightness during the brightness adjustment period. For example, in the example embodiment, a ratio of the display brightness increase during the enhanced brightness period, defined as a ratio of the increased display brightness relative to the display brightness during normal game play, is about 3:1. In other embodiments, the ratio of display brightness increase may be between 1.5:1 and 5:1, 2:1 and 4:1, and 2.5:1 and 3.5:1. Moreover, in some embodiments, the display brightness increase may be near instantaneous, such that the display brightness line has a substantially vertical slope (or slope of one) at 50 ms to 900 nits.

In the example embodiment, the increase in display brightness is held at 900 nits for a time period of 50 ms (i.e., from 75 ms to 125 ms in FIG. 6), also referred to herein as a "brightness burst period" or "pop period", indicated at 608. The time period for the increased brightness may be based on a predetermined value stored in the memory 405. From time period 125 ms to 150 ms (also referred to herein as a "ramp down period"), indicated at 6010, the brightness is brought back down to the baseline brightness setting of 300 nits.

In some embodiments, the monitor controller board 412 may automatically control the brightness to revert to the baseline setting after expiration of the predetermined time period. In other embodiments, the game controller 402 may send a secondary signal to the monitor controller board 412, after expiration of the predetermined time period, that causes the monitor controller board 412 to revert to the baseline brightness setting. Moreover, in some embodiments, the time period may be based on one or more user inputs. For example, in some embodiments, the game may trigger a player selection (e.g., a wager selection, a symbol selection, a column selection, etc.). In such embodiments the increased brightness may be held until the player selection is received.

In other embodiments, the ramp-up period, the brightness burst period, and/or the ramp down period may be any suitable time periods. For example, in some embodiments the brightness burst may be held for several seconds or for only a few microseconds.

In some embodiments, the brightness burst effect may include a series of brightness bursts with the display brightness being adjusted between the burst brightness value and the baseline brightness value, or another brightness value less than the burst brightness value, multiple times in series. For example, in some embodiments, the brightness burst effect may include three or more brightness bursts, each separated by a reduced brightness period in which the display brightness is lowered relative to the brightness burst level.

Figure 7:
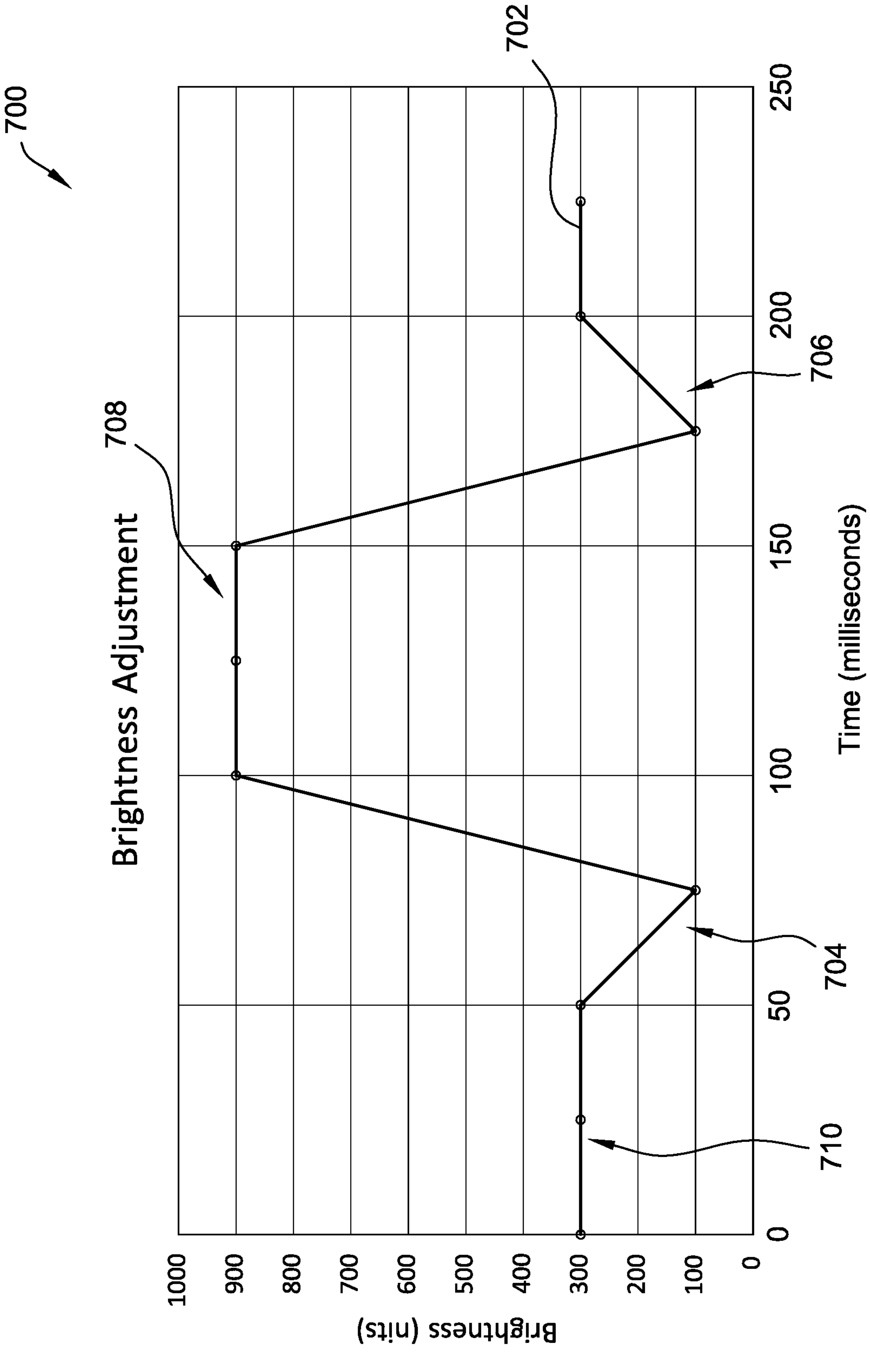
FIG. 7 is a chart showing display brightness of a display of the gaming device shown in FIG. 4, according to a second brightness command.

FIG. 7 is a chart 700 showing display brightness 702 in nits varied over a given time period for a second brightness command. The vertical axis indicates brightness of the display panel in nits and the X-axis indicates time in milliseconds. The second brightness command is substantially the same as the first brightness command, shown in FIG. 6, except as described differently herein. In particular, the second brightness command includes brightness dips 704, 706, that immediately precede and follow the brightness burst 708.

In the example, at time 50 ms, the brightness burst feature is initiated. The brightness feature begins with a first brightness dip 704 below the baseline display brightness 710 from 300 nits to 100 nits over the time periods of 50 ms to 75 ms. At 75 ms, the display brightness is increased from 100 nits to 900 nits, and held at 900 nits for 50 ms during the brightness burst time period 708. At 150 ms, the display brightness is ramped down back to 100 nits for a second brightness dip 706 over the time period between 150 ms and 175 ms. The display brightness is then increased from the second brightness dip 706 during the time period of 175 ms and 200 ms to the baseline display brightness 710 value of 300 nits.

In the example embodiment, the brightness dips 704, 706 provide a visual contrast with the brightness burst display level to further visually accentuate the brightness burst 708. For example, because the display brightness is reduced below the baseline brightness levels 710 proximate in time to the brightness burst 708, the visual differentiation in the display presented to the user is increased. In other embodiments, the first and/or second display brightness dips 704, 706 may be held for predetermined time periods (e.g., 50 ms) prior to increasing the brightness to the brightness burst

708 or baseline levels 710. In further embodiments, only one of the first and second display dips 704, 706 may be used.

Exemplary technical effects of the methods, systems, and apparatus described herein include at least one of: (a) providing additional visual features (a “pop” of brightness) without otherwise altering the game content display or animations; (b) providing flexibility in game display lighting options and tailoring of brightness for different games; (c) Enabling different brightness when the machine is operating in an attract mode to when being used for game play; (d) providing a visually accentuated change in brightness by decreasing the display brightness from a baseline brightness prior to increasing the brightness above the baseline; (e) reduced time to develop games by providing trigger conditions also used for animations or other visual auditory affects to activate brightness control commands; and (f) improved integrated control of display parameters based by utilizing a DDC connection between a monitor controller board and a game controller.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming device comprising:
- a display assembly including a monitor controller board, a display panel, and a backlight for controlling a display brightness of the display panel;
- at least one memory device with instructions stored thereon;
- at least one processor in communication with the at least one memory device;
- a display connector providing communication between the at least one processor and the monitor controller board, wherein execution of the instructions by the at least one processor causes the at least one processor to:
  - determine that a trigger condition of a plurality of trigger conditions has occurred, the trigger condition being stored in the at least one memory device in association with both a brightness command and an animation;
  - identify the brightness command and the animation based upon the trigger condition and at least one lookup in the at least one memory device;
  - transmit the brightness command to the monitor controller board, wherein the brightness command causes the monitor controller board to control the backlight; and
  - cause display at the display panel of the animation while the backlight is controlled according to the brightness command, the brightness command being synchronized with the animation to dynamically change the display brightness during display of the animation between a first brightness level and a second brightness level.

2. The electronic gaming device of claim 1, wherein the brightness command causes the monitor controller board to control the backlight to initially decrease the brightness level from the first brightness level to a third level, prior to increasing the display brightness to the second brightness level, the first brightness level having a brightness that is between the second brightness level and the third brightness level.

3. The electronic gaming device of claim 1, wherein the brightness command includes a predetermined time period during which display brightness of the display panel is maintained at the second brightness level.

4. The electronic gaming device of claim 1, wherein the brightness command is a first brightness command, and wherein execution of the instructions by the at least one processor further causes the at least one processor to transmit a second brightness command after transmission of the first brightness command, wherein the second brightness command causes the monitor controller board to control the backlight to decrease display brightness from the second brightness level to the first brightness level.

5. The electronic gaming device of claim 1, wherein the display connector includes a Display Data Channel (“DDC”), and wherein the brightness command is transmitted to the monitor controller board using the DDC.

6. The electronic gaming device of claim 5, wherein the brightness command is transmitted using a Monitor Control Command Set communications protocol.

7. The electronic gaming device of claim 1, wherein execution of the instructions further causes the at least one processor to:
- determine a player backlight preference based upon a player input; and
- cause the player backlight preference to be stored in a player account, wherein the player account is associated with a player who provided the player input.

8. The electronic gaming device of claim 1, wherein the animation comprises a game outcome animation.

9. The electronic gaming device of claim 1, wherein the trigger condition comprises a game outcome.

10. The electronic gaming device of claim 1, wherein the trigger condition comprises a player input.

11. A non-transitory, computer-readable storage medium with instructions stored thereon that, in response to execution by at least one processor, cause the at least one processor to:
- determine that a trigger condition of a plurality of trigger conditions medium has occurred, the trigger condition being stored in the storage medium in association with both a brightness command and an animation;
- identify the brightness command and the animation based upon the trigger condition and at least one lookup in the storage medium;
- transmit the brightness command to a monitor controller board of a display device, wherein the brightness command causes the monitor controller board to control a backlight of the display device; and
- cause display at the display device of the animation while the backlight is controlled according to the brightness command, the brightness command being synchronized with the animation to dynamically change the display brightness during display of the animation between a first brightness level and a second brightness level.

12. The non-transitory, computer-readable storage medium of claim 11, wherein the brightness command causes the monitor controller board to control the backlight to initially decrease the brightness from the first brightness level to a third brightness level, prior to increasing the brightness of the display device to the second brightness level, the first brightness level having a brightness that is between the second brightness level and the third brightness level.

13. The non-transitory, computer-readable storage medium of claim 11, wherein the brightness command includes a predetermined time period during which display brightness of the display device is maintained at the second brightness level.

14. The non-transitory, computer-readable storage medium of claim 11, wherein the brightness command is a first brightness command, and wherein the instructions, when executed by the at least one processor, further cause the at least one processor to transmit a second brightness command after transmission of the first brightness command, wherein the second brightness command causes the monitor controller board to control the backlight to decrease display brightness from the second brightness level to the first brightness level.

15. The non-transitory, computer-readable storage medium of claim 11, wherein the brightness command is transmitted using a Monitor Control Command Set communications protocol.

16. An electronic gaming device comprising:

a game controller configured to generate a game outcome;

a display device comprising:

a display panel;

a backlight for controlling a brightness of the display panel; and a monitor controller board in communication with the backlight and the display panel; and a display connector providing communication between the game controller and the monitor controller board, wherein the game controller is configured to:

determine that a trigger condition of a plurality of trigger conditions has occurred;

identify a brightness command and an animation based upon the trigger condition and at least one lookup in at least one memory device of the game controller, the trigger condition being stored in the at least one memory device in association with both the brightness command and the animation;

transmit the brightness command to the monitor controller board, wherein the brightness command causes the monitor controller board to control the backlight; and cause display at the display panel of the animation while the backlight is controlled according to the brightness command, the brightness command being synchronized with the animation to dynamically change the display brightness during display of the animation between a first brightness level and a second brightness level.

17. The electronic gaming device of claim 16, wherein the brightness command causes the monitor controller board to control the backlight to initially decrease the display brightness from the first brightness level to a third level, prior to increasing the display brightness to the second brightness level, the first brightness level having a brightness that is between the second brightness level and the third brightness level.

18. The electronic gaming device of claim 16, wherein the brightness command includes a predetermined time period during which the display brightness is maintained at the second brightness level.

19. The electronic gaming device of claim 16, wherein the brightness command is a first brightness command, and wherein the game controller is further configured to transmit a second brightness command after transmission of the first brightness command, wherein the second brightness command causes the monitor controller board to control the backlight to decrease the display brightness from the second brightness level to the first brightness level.

20. The electronic gaming device of claim 16, wherein the display connector includes a Display Data Channel ("DDC"), and wherein the brightness command is transmitted to the monitor controller board using the DDC.

* * * * *